(12) United States Patent
Carriero et al.

(10) Patent No.: US 10,978,095 B2
(45) Date of Patent: Apr. 13, 2021

(54) CONTROL OF INCOMING CALLS

(71) Applicant: International Business Machines Corporation, Armonk, NY (US)

(72) Inventors: Donatello Carriero, Rome (IT); Patrizia Manganelli, Rome (IT)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 16/181,732

(22) Filed: Nov. 6, 2018

(65) Prior Publication Data

US 2020/0143822 A1 May 7, 2020

(51) Int. Cl.
| | |
|---|---|
| *G10L 25/63* | (2013.01) |
| *G10L 25/51* | (2013.01) |
| *H04L 29/06* | (2006.01) |
| *H04M 3/54* | (2006.01) |
| *G10L 17/02* | (2013.01) |

(52) U.S. Cl.
CPC .............. *G10L 25/63* (2013.01); *G10L 17/02* (2013.01); *G10L 25/51* (2013.01); *H04L 65/1079* (2013.01); *H04M 3/543* (2013.01)

(58) Field of Classification Search
CPC ..... H04L 65/1079; H04M 3/543; G10L 25/63
See application file for complete search history.

(56) References Cited

U.S. PATENT DOCUMENTS

| | | | |
|---|---|---|---|
| 7,068,767 B2 | 6/2006 | Moss et al. | |
| 8,548,447 B1 | 10/2013 | Kirchhoff et al. | |
| 9,226,159 B1* | 12/2015 | Cao | H04W 12/12 |
| 9,462,105 B2 | 10/2016 | Feller | |
| 9,584,658 B2* | 2/2017 | Cohen | H04M 3/436 |
| 9,648,153 B2 | 5/2017 | Wen et al. | |
| 10,455,085 B1* | 10/2019 | Roundy | G10L 15/1815 |
| 2007/0071212 A1 | 3/2007 | Quittek et al. | |
| 2008/0123823 A1 | 5/2008 | Pirzada et al. | |
| 2009/0103701 A1* | 4/2009 | Garg | H04M 3/436 379/142.04 |
| 2010/0246795 A1* | 9/2010 | Saha | H04M 3/436 379/210.02 |
| 2013/0176865 A1 | 7/2013 | Boland et al. | |
| 2014/0199975 A1 | 7/2014 | Lou et al. | |

(Continued)

FOREIGN PATENT DOCUMENTS

WO 2012042200 A1 4/2012

OTHER PUBLICATIONS

Broussard, M., "WhoApp' Provides Users With Detailed Unknown Caller Information for Free [Updated]", MacRumors—New and Rumors You Care About, May 18, 2016, 9 pages https://www.macrumors.com/2016/05/18/whoapp-unknown-caller-free/.

(Continued)

*Primary Examiner* — Douglas Godbold
(74) *Attorney, Agent, or Firm* — James L. Olsen

(57) ABSTRACT

Aspects of the present disclosure relate to controlling incoming calls. A call recording corresponding to at least a portion of a call between a receiver and a caller is received. A warning status of the call is verified according to a conversation pattern of the call recording. A warning structure is updated with call information based on the conversation pattern, the warning structure used for controlling future incoming calls.

14 Claims, 8 Drawing Sheets

(56) References Cited

U.S. PATENT DOCUMENTS

| | | | | |
|---|---|---|---|---|
| 2014/0348308 | A1* | 11/2014 | Krause | G10L 17/00 379/88.02 |
| 2015/0086001 | A1* | 3/2015 | Farrand | H04M 3/436 379/210.02 |
| 2015/0112680 | A1* | 4/2015 | Lu | G10L 15/142 704/244 |
| 2016/0309023 | A1* | 10/2016 | Sugimoto | H04M 3/42374 |
| 2016/0360036 | A1* | 12/2016 | Ansari | H04M 3/436 |
| 2017/0019534 | A1* | 1/2017 | Qin | H04M 3/436 |
| 2017/0048388 | A1* | 2/2017 | Sharpe | H04M 3/436 |
| 2017/0118335 | A1* | 4/2017 | Brackett | H04M 3/4365 |
| 2017/0134574 | A1* | 5/2017 | Winkler | H04M 3/42059 |
| 2018/0124242 | A1* | 5/2018 | Zimmerman | H04M 3/5175 |
| 2019/0253558 | A1* | 8/2019 | Haukioja | G10L 15/22 |

OTHER PUBLICATIONS

Unknown, "Hiya: Revolutionizing the phone experience", 2018 Hiya Inc., 3 pages https://hiya.com/.

Torrevillas, C., "Mr. Number: call block & reverse lookup", appPicker, Jun. 20, 2017, 5 pages http://www.apppicker.com/applists/27779/the-best-call-blocking-apps-for-iphone.

Sahin et al., "Using chatbots against voice spam: Analyzing Lenny's effectiveness", usenix—the advanced computing systems association, Proceedings of the Thirteenth Symposium on Usable Privacy and Security (SOUPS 2017), Jul. 12-14, 2017, 21 pages.

* cited by examiner

# CONTROL OF INCOMING CALLS

BACKGROUND

The present disclosure relates generally to the field of information technology, and in particular to controlling incoming calls.

Calls are commonly used to establish communication between two or more persons in an interactive way with the aid of technology. For example, telephone calls (e.g., voice over internet protocol (VoIP) or landline calls) can be made and received by individuals (operating as callers and receivers, respectively) using corresponding telephones. Telephones can receive calls from caller (telephone) numbers, which can be unknown to the receiver.

Often, calls from unknown caller numbers are unwanted. For example, the unwanted calls can be received from telemarketers, recruiters, political organizations, etc. Moreover, the calls can be received from malicious parties, such as for phishing, scamming, and stalking. These kinds of calls can endanger the receiver.

SUMMARY

Embodiments of the present disclosure relate to a system, method, and computer program product for controlling incoming calls. A call recording corresponding to at least a portion of a call between a receiver and a caller can be received. A warning status of the call can be verified according to a conversation pattern of the call recording. A warning structure can then be updated with call information based on the conversation pattern, the warning structure used for controlling future incoming calls.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1A:
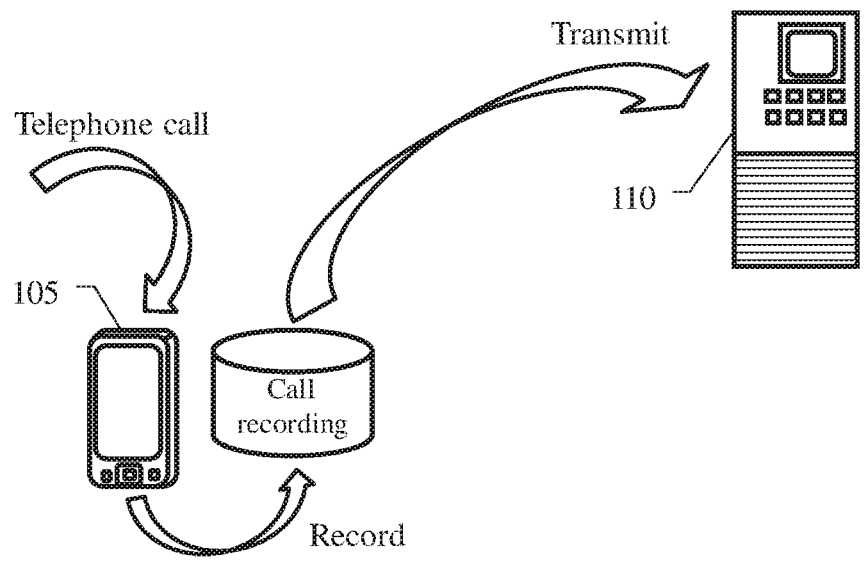
FIGS. 1A, 1B, 1C, and 1D are diagrams illustrating the controlling of incoming calls, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of information technology, and in particular to controlling incoming calls. While the present disclosure is not necessarily limited to such applications, various aspects of the disclosure can be appreciated through a discussion of various examples using this context.

Calls are commonly used to establish communication between two or more persons in an interactive way with the aid of technology. For example, telephone calls (e.g., voice over internet protocol (VoIP) or landline calls) can be made and received by individuals (operating as callers and receivers, respectively) using corresponding telephones. Telephones can receive calls from caller numbers, which can be unknown to the receiver.

Often, calls from unknown caller numbers are unwanted. For example, the unwanted calls can be received from telemarketers, recruiters, political agencies, etc. Moreover, the calls can be received from malicious parties, such as for phishing, scamming, and stalking. These kinds of calls can endanger the receiver.

In many countries, regulators offer the possibility to register into a do-not-call list to avoid receiving calls for telemarketing purposes. However, some countries do not provide this possibility, or they provide it in a limited way (for example, only for land telephones). Moreover, the do-not-call list does not apply to calls for other purposes. In any case, this technique can be ineffective against malicious parties.

Several technical measures have also been proposed for limiting the calls that can be unwanted when the telephone is provided with processing capabilities, (e.g., in a smartphone).

In particular, it is possible to create a personal blacklist of caller numbers. In these instances, whenever a call is received from any caller number included on the blacklist, the call is automatically blocked. However, the maintenance of the blacklist is a manual task and thus can be time consuming. Moreover, it can be difficult to adapt the blacklist dynamically based on contingent needs (e.g., when the receiver becomes interested in buying a specific product, but the number associated with the vendor is blocked) of the receiver.

Caller identification can also be used to aid in providing receivers the ability to decline unwanted calls. One or more databases can be maintained by central entities (for example, service providers, public authorities) for identifying the callers. Whenever a call is received from any caller number that is unknown, the caller number is searched in the database, and if the caller number is found, the telephone retrieves corresponding identification information from the database and displays it, to allow the receiver to decide whether to accept or decline the call. However, the database may not be up-to-date. In any case, the database simply informs the receiver about the identity of the caller.

Calls can also be analyzed to verify whether they have been performed by a person or by a machine (for example, according to a reaction to a salutation and/or to questions). In these instances, calls from machines can be blocked. However, this can be ineffective against calls from people.

When a caller identification is not available, the caller can be advised that the receiver does not accept calls for telemarketing purposes. In these instances, the caller can be prompted to provide audible identification information (such as to state his/her name). However, this information is typically provided by the caller. Therefore, this information can be inaccurate or deliberately wrong.

Aspects of the present disclosure relate to the controlling incoming calls. After a terminal device (e.g., a smart phone) receives a call, the call can be recorded and transmitted to a server for processing. The server can determine a warning status of the call based on the conversation that occurred during the call. A warning structure can be updated with call information, such as the name of the caller, the number of the caller, the purpose of the call, the mood (e.g., sentiment) of the receiver during the call, etc. Upon receiving a call from the same caller number, the call information included in the warning structure can be displayed to the receiver. In embodiments, additional actions can be executed based on the warning structure (e.g., the call can be blocked, prevented, processed, etc.).

Referring now to the figures, FIGS. 1A-1D are diagrams depicting the controlling of incoming calls, in accordance with embodiments of the present disclosure.

At FIG. 1A, a call is received by a terminal device of a receiver, for example, a smartphone 105. When the caller number is unknown, the smartphone 105 can generate a call recording for the call (e.g., by recording the call or a part thereof). The smartphone 105 can then transmit the call recording to a service computing machine, for example, a server 110 implementing a service for controlling incoming calls.

Figure 1B:
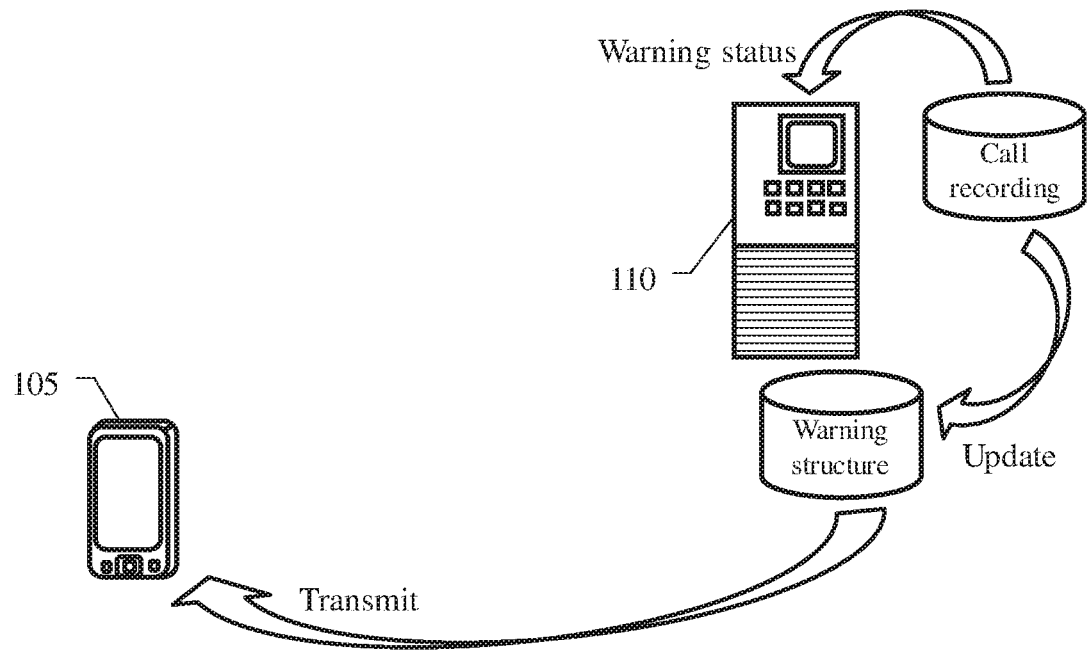

Moving to FIG. 1B, the server 110 verifies (e.g., determines) a warning status of the call. The verification is performed according to a conversation pattern of the call recording. For example, the server 110 can determine the warning status of the call when the receiver asks the name of the caller, when the receiver inquires the purpose of the call, and/or when the receiver expresses his/her mood during telephone call. In response to the warning status of the call, the server 110 can determine call information of the call. The call information can be based on the conversation pattern of the call recording (e.g., including the name of the caller, the purpose of the telephone call, and the mood of the receiver). The server 110 can update a warning structure that includes the call information of one or more warning (telephone) numbers from which the smartphone 105 has received calls that have been recognized in the warning status in the past. The warning structure is updated according to the caller number and the call information of the call (e.g., by adding a corresponding new entry). The server 110 can then transmit the warning structure, or its updates, to the smartphone 105.

Figure 1C:
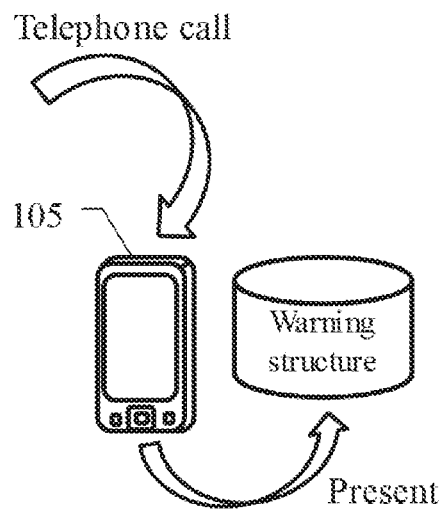

Moving to FIG. 1C, the smartphone 105 receives an additional call. The call is received from a caller number that is included in the warning numbers of the warning structure.

Figure 1D:
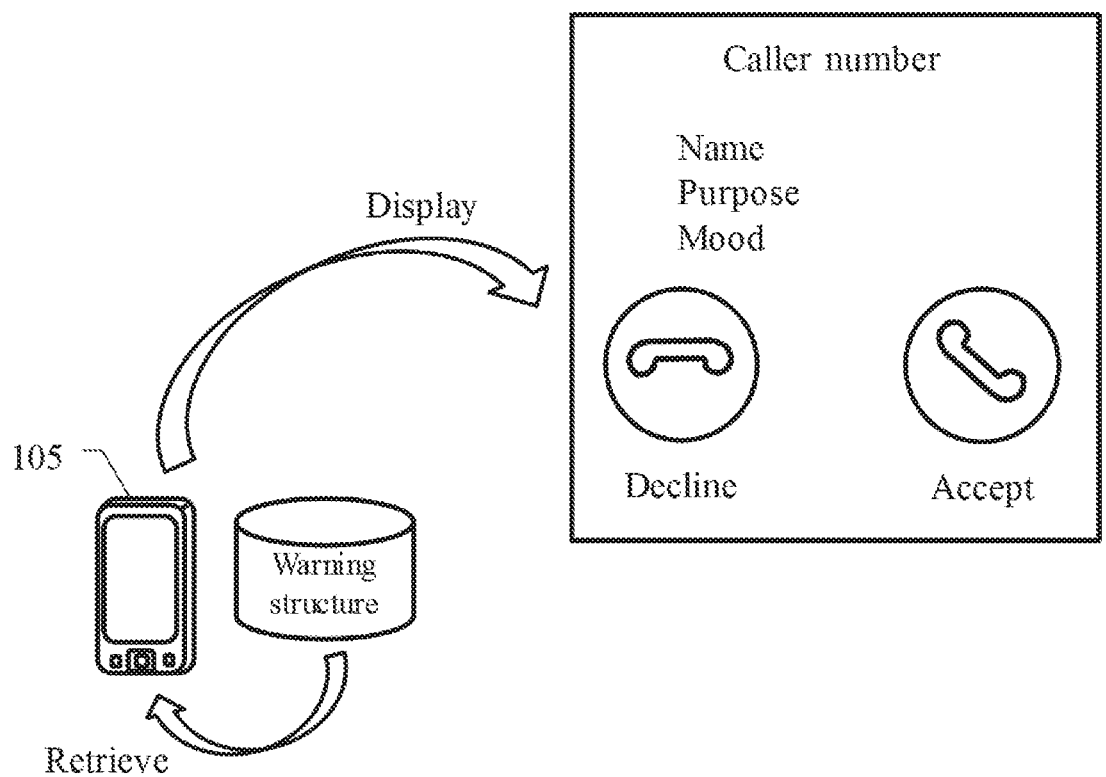

Moving to FIG. 1D, the smartphone 105 retrieves the call information of the caller number from the warning structure. The smartphone 105 then displays an indication of the call that is received in association with the call information of the caller number. For example, the smartphone 105 can display the caller number and two icons for accepting or declining the call. Additionally, the smartphone 105 can display the estimated name of the caller, the purpose of the call, and the mood of the receiver (as determined from one or more previous calls received from the same caller number in the past).

As depicted in FIGS. 1A-1D, a receiver can be provided accurate information about various callers, including the identity of the callers, the purposes of the calls, and/or the receiver's attitude towards the calls.

The above-described solution is of general applicability to any kind of call (e.g., an internet protocol call, a landline call, etc.). Moreover, the call information can be collected automatically (with limited manual intervention) and can be adapted dynamically to the contingent needs of the receiver.

Figure 2:
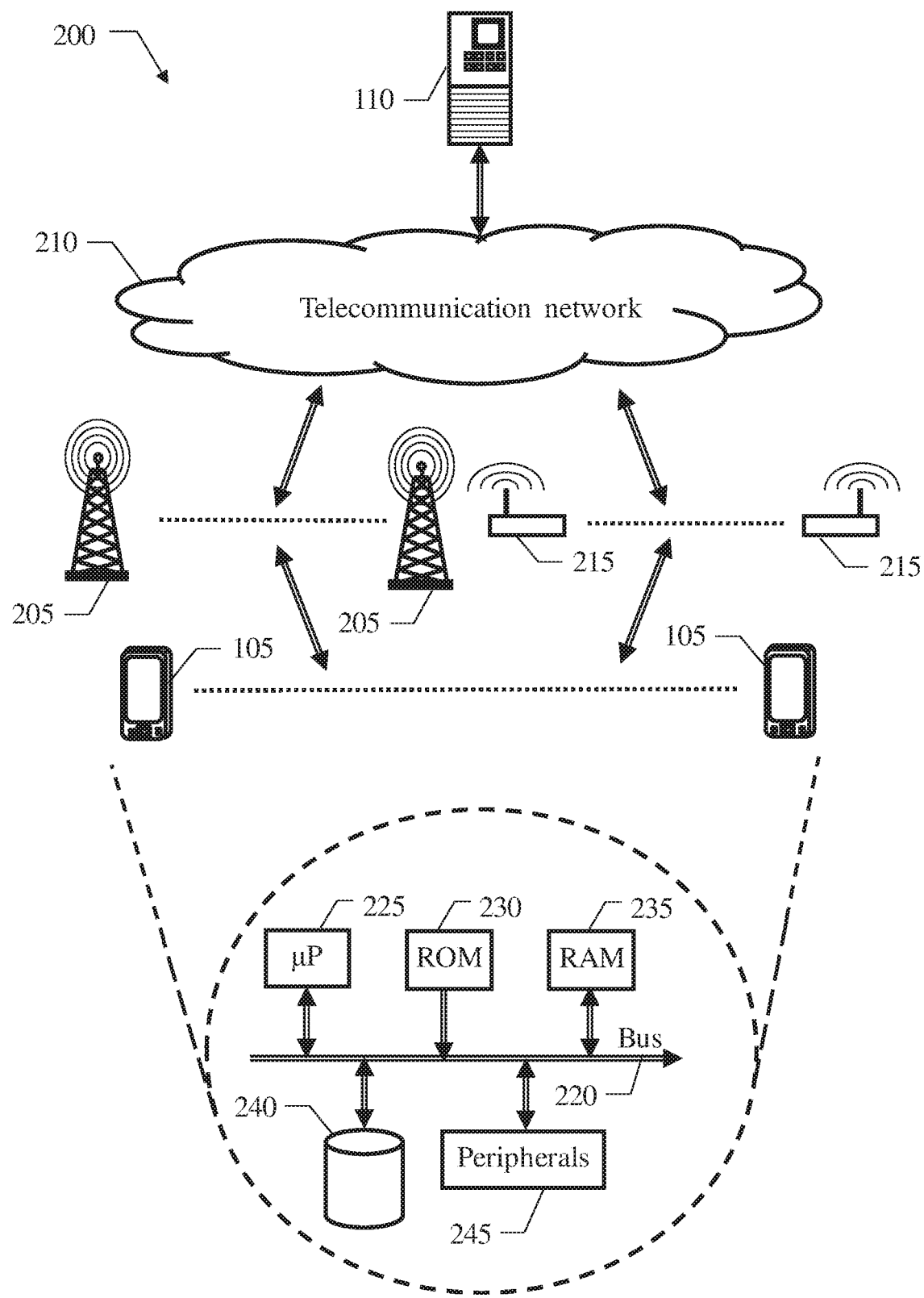
FIG. 2 is a diagram illustrating a computing environment in which illustrative embodiments of the present disclosure can be implemented.

Referring now to FIG. 2, a schematic block diagram is shown of a computing environment 200 in which illustrative embodiments of the present disclosure can be implemented.

The computing environment 200 includes one or more instances of the smartphone 105 and the server 110, which offers the above-mentioned service for controlling incoming calls to all the smartphones 105 that are registered with it. The smartphones 105 are connected to one or more telephone networks 205, which allow the smartphones 105 to utilize services offered by their telephone operators. The telephone networks 205 can provide connections (e.g., based on the 2G, 3G, 4G, etc. technology) for performing calls. Moreover, the telephone networks 205 provide connections (e.g., based on 2G, 3G, 4G, etc. technology) for exchanging data. Particularly, the connections are used by the smartphones 105 to communicate with the server 110 over the telecommunication networks 210 (e.g., on the Internet). The smartphones 105 can also be connected to one or more access points 215 (e.g., Wi-Fi), which further provide access to the telecommunication network 210 for communicating with the server 110.

Each computing system formed by the server 110 or smartphones 105 comprises several units that interface through a bus architecture 220 with one or more levels. Particularly, one or more microprocessors (μP) 225 control operation of the computing system 105, 110. A non-volatile memory (ROM) 230 stores basic code for a bootstrap of the computing system 105, 110 and a volatile memory (RAM) 235 is used as a working memory by the microprocessors 225. The computing system 105, 110 is provided with storage 240 (e.g., hard disk drives (HDDs), solid state drives (SSDs), magnetic tapes, etc.) for storing programs and data (e.g., storage devices (e.g., HDDs, SSDs, tapes) of a data center of server 110 or flash EEPROM of the smartphone 105). Moreover, the computing system 105, 110 comprises a number of controllers for peripherals 245 (Input/Output (I/O) units). For example, the peripherals 245 of the server 110 can comprise a network interface card (NIC) for communicatively coupling the server 110 to a data center and then connecting it to a console of the data center for its control (e.g., a personal computer provided with a drive for reading/writing removable storage units, such as optical disks like DVDs) and to a switch/router sub-system of the data center for its communication with the telecommunication network 210. The peripherals 245 of the smartphone 105 can comprise a telephone transceiver (TX/RX) for communicating with the telephone networks 205, a wireless NIC for communicating with the access points 215, and a touch-screen for displaying information and entering commands.

Figure 3:
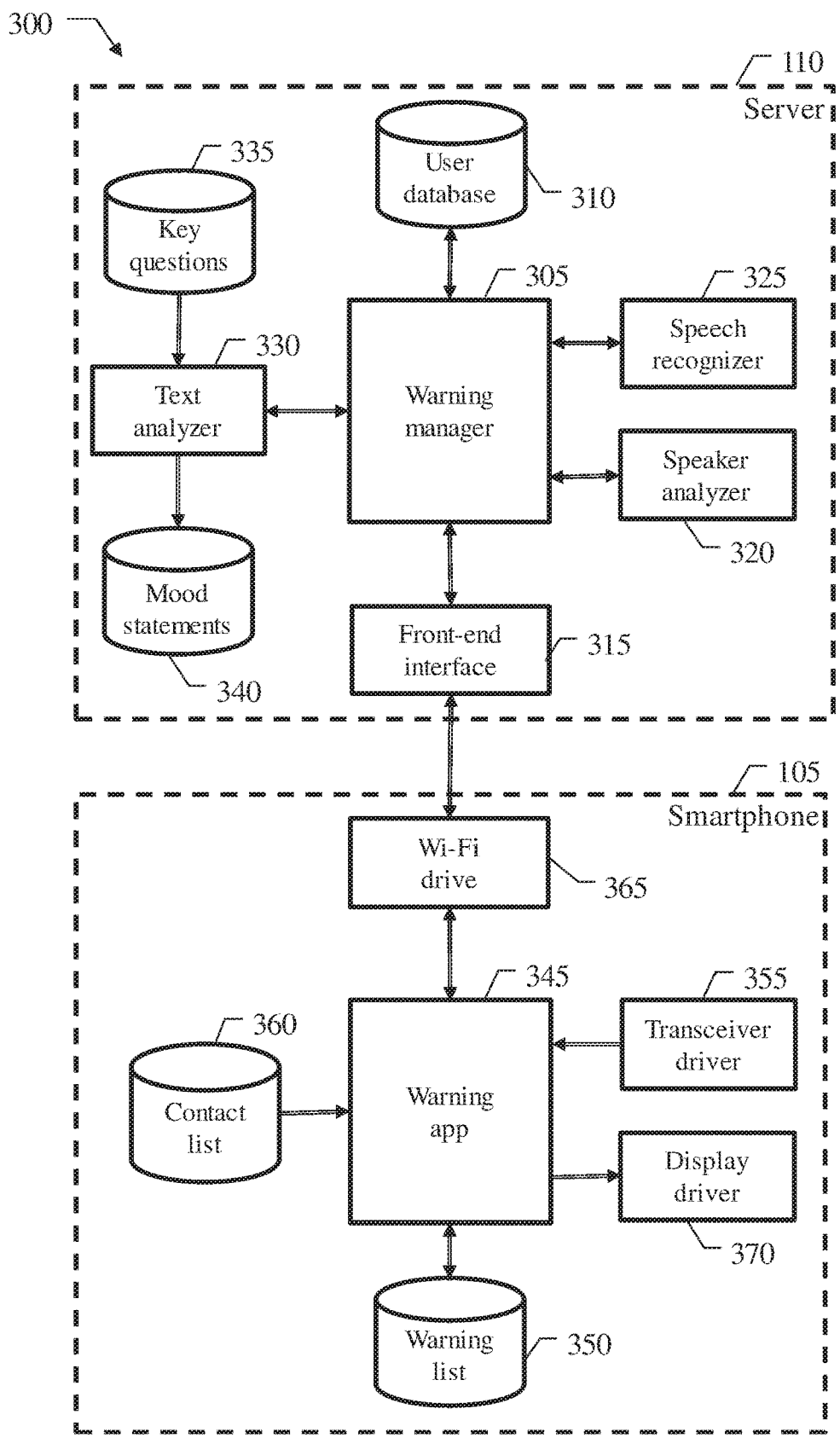
FIG. 3 is a diagram illustrating components of a smartphone and a server used for controlling incoming calls, in accordance with embodiments of the present disclosure.

Referring now to FIG. 3, exemplary software components of the server 110 and smartphone 105 are depicted, in accordance with embodiments of the present disclosure.

The software components can be stored in the storage (e.g., SSD or HDD) and loaded (at least in part) into the working memory (e.g., RAM) of each computing system 105, 110 when the programs are running. The programs can be initially installed into the storage, for example, from removable storage units or from the telecommunication network. In this respect, each program can be a module, segment or portion of code, which comprises one or more executable instructions for implementing the specified logical function.

A warning manager 305 manages the service for controlling the calls that are received by all the smartphones 105 and users thereof (e.g., persons that are registered with the warning manager 305). The warning manager 305 accesses (in read/write mode) a user database 310. The user database 310 can comprise a user table, a personal caller table for each user, and a global caller table (for all the users). The user table can have an entry for each user. Each entry of the user table comprises one or more receiver numbers of each user that can receive calls and corresponding voiceprints of one or more possible receivers. The voiceprint of each receiver indicates one or more voice biometrics of the receiver (e.g., characteristics of his/her voice), for example, based on frequency estimations, Hidden Markov Models or Gaussian Mixture Models.

Moreover, each entry of the user table can include one or more warning numbers. For each warning number, the entry can include corresponding identifiers of one or more warning callers of the warning number. The personal caller table of each user can have an entry for each warning caller of the user. The entry of the personal caller table can include the identifier of the warning caller and corresponding call information. The global caller table can have an entry for each warning caller of all the users. The entry of the global caller table can include the identifier of the warning caller and his/her voiceprint.

Moreover, the call information of each warning caller can be available for all the warning numbers that he/she can use. The warning manager 305 can interact with a front-end interface 315 for communicating with the smartphones 105 of its users. The warning manager 305 utilizes a speaker analyzer 320. The speaker analyzer 320 analyzes any call recording with respect to its speakers (e.g., the persons who uttered it). Particularly, the speaker analyzer 320 can use (speaker) diarization techniques to partition the call recording into vocal segments that are uttered by different speakers and speaker recognition techniques to identify the speakers (according to their voiceprints). The warning manager 305 further utilizes a speech recognizer 325. The speech recognizer 325 can recognize a content of any vocal segment of the call recording and translates it into a corresponding text message. The warning manager 305 further utilizes a text analyzer 330. The text analyzer 330 can analyze the text messages of any call recording to verify the warning status of the corresponding call and to determine its call information.

In embodiments, the text analyzer 330 accesses (in read mode) a key question repository 335 and a mood statement repository 340. The key question repository 335 can store one or more key questions that can be asked by the receivers (e.g., "Who is calling?", "What is your company?", "Why are you calling?" and so on). The question key repository 335 can include key questions for all the users and possible corresponding key questions for one or more users. The mood statement repository 340 can store one or more mood statements that are indicative of a mood of the receivers (e.g., "I am not interested", "I do not have time", "I am leaving" and so on). The mood statement repository 340 can contain mood statements for all the users and possible corresponding (custom) mood statements for one or more users.

A warning mobile application, or warning app, 345 can control the calls that are received by the smartphone 105. The warning app 345 accesses (in read/write mode) a warning list 350. The warning list 350 can contain the warning numbers of the user of the smartphone 105, each with the corresponding call information. The warning app 345 interfaces with a transceiver drive 355 that drives the telephone transceiver of the smartphone 105. The warning app 345 accesses (in read mode) a contact list 360 of the smartphone. The contact list 360 has an entry for each contact of the user of the smartphone; the entry comprises the telephone number of the contact and corresponding identification information (e.g., name and surname). The warning app 350 interacts with a Wi-Fi drive 365 for communicating with the server 110 via any available access points. The warning app 345 controls a display drive 370 that drives the display of the smartphone 105.

Figure 4A:
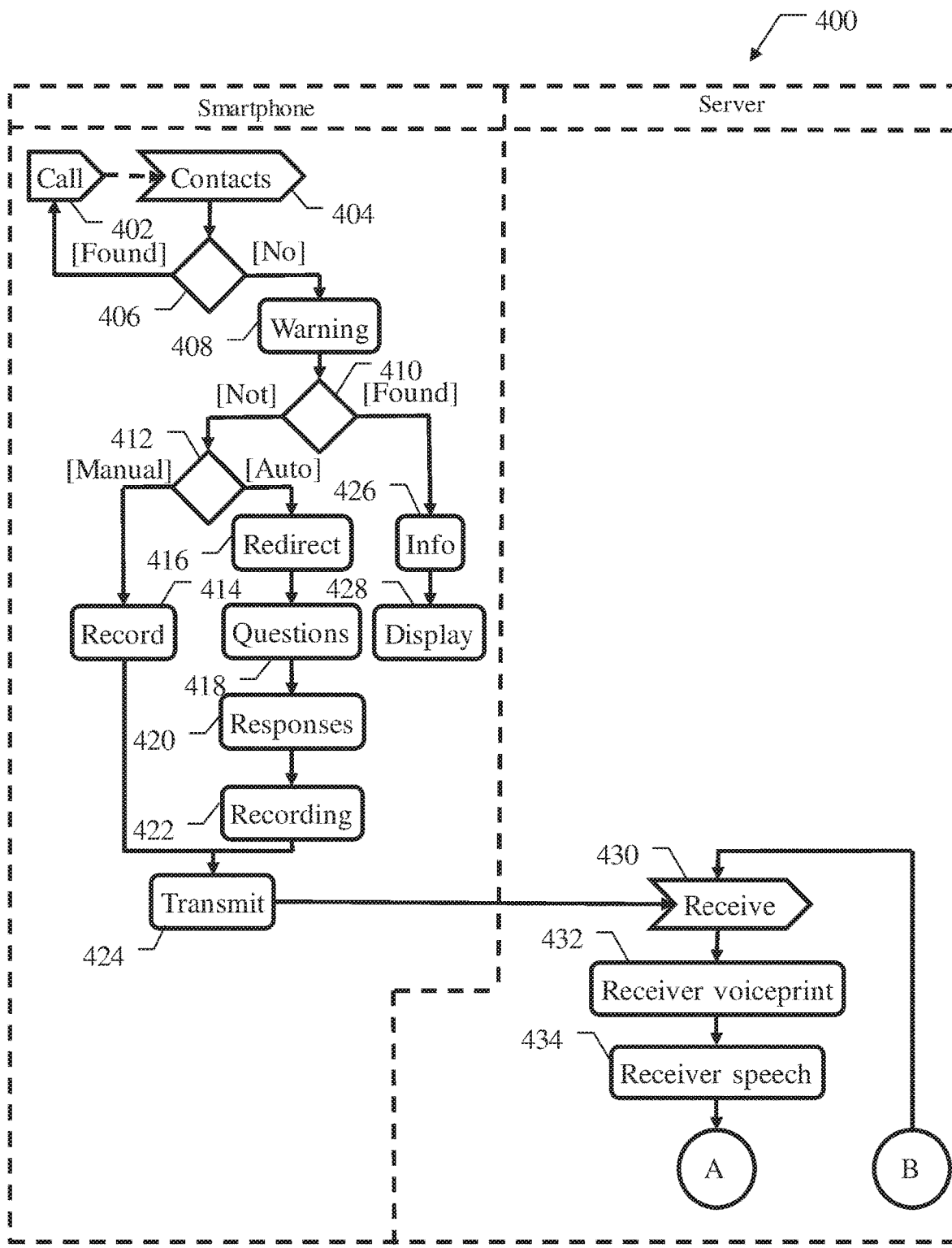
FIGS. 4A, 4B, and 4C are flow-diagrams collectively illustrating a process for controlling incoming calls, in accordance with embodiments of the present disclosure.
Figure 4B:
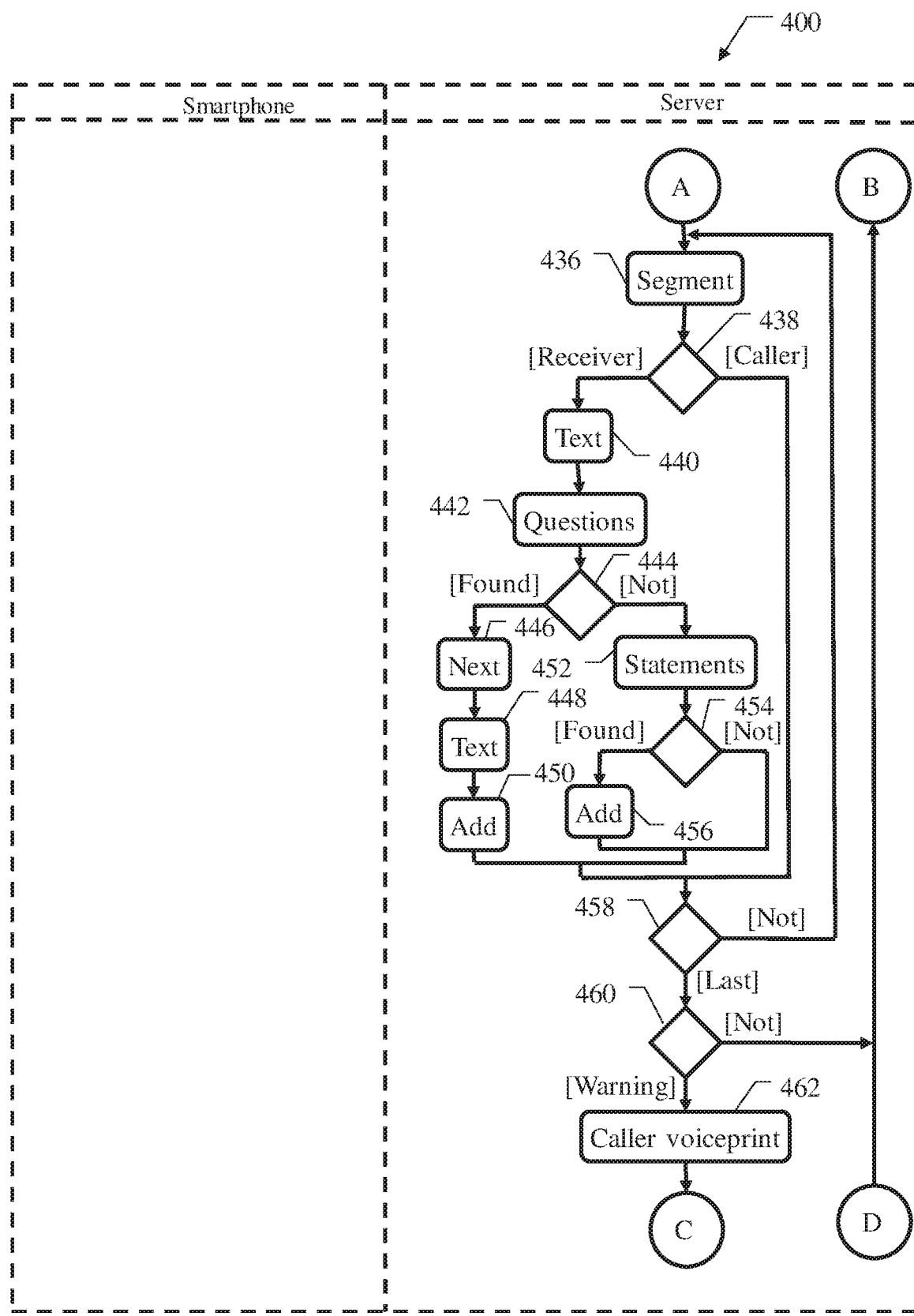
Figure 4C:
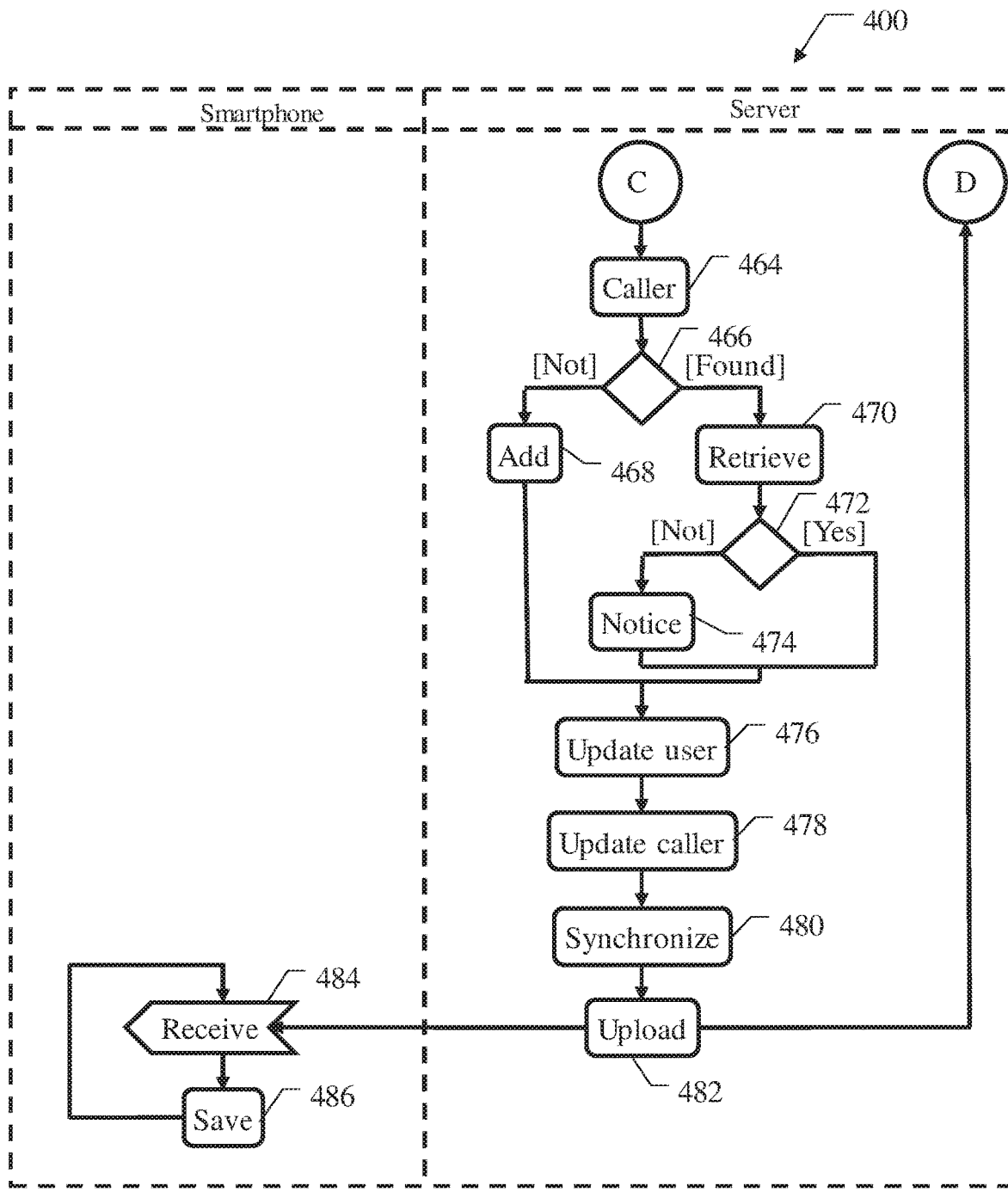

With reference now to FIGS. 4A-4C, shown are flow diagrams collectively illustrating a process 400 for controlling incoming calls, in accordance with embodiments of the present disclosure. Each operation can correspond to one or more executable instructions for implementing the specified logical function on a corresponding computing machine.

Referring now to FIG. 4A, shown is a first portion of the process 400 for controlling calls received by a smartphone (e.g., smartphone 105), in accordance with embodiments of the present disclosure. Starting from the swim-lane of the smartphone, the smartphone receives a call. This is illustrated at operation 402. In response to receiving the call at operation 402, a warning app (e.g., warning app 345) on the smartphone references the contacts of the smartphone. This is illustrated at operation 404. A determination is made whether the caller number is included in the contacts of the smartphone. This is illustrated at operation 406.

If a determination is made that the call number corresponds to a number found in the contact list, then process 400 returns to operation 402, where the smartphone can wait for another call. Accordingly, if a determination is made that the calling number is found in the receiver's contacts, the warning app does not perform any further action, and the call is processed as usual (because the caller number is known to the receiver).

Conversely, if a determination is made that the caller number is not found in the contact list, the warning app references a warning list. This is illustrated at operation 408. A determination is then made whether the caller number is included in the warning list. This is illustrated at operation 410. If a determination is made that the caller number is not found in the warning list, then process 400 proceeds to operation 412, where a determination is made whether the warning app is configured in manual mode or automatic mode. This is illustrated at operation 412.

If the warning app is configured in a manual mode, process 400 proceeds to operation 414. As soon as the receiver responds to the call (though not shown in the figure, if the user does not respond to the call, the process 400 returns to operation 402 without performing any action), the warning app starts recording the call (e.g., via a transceiver drive). This is illustrated at operation 414. The recording of the call continues for a predefined period (e.g., 1 minute, 5 minutes, 15 minutes, etc.) or until the call is terminated. During this period, the receiver can initiate a conversation with the caller by asking one or more of the key questions (to obtain corresponding answers from the caller) and/or by uttering one or more of the mood statements or the like. This results in a vocal stream that defines the call recording. The manual mode allows interacting with the caller to force him/her to provide the required answers and it allows the receiver to express his/her mood against the call.

Referring back to operation 412, if a determination is made that the warning app is configured in an automatic mode, the warning app redirects the call to an answering service (e.g., a voicemail provided by the telephone operator of the user). This is illustrated at operation 416. The answering service can be configured by the warning app (via a Wi-Fi driver) with a greeting message containing one or more of the key questions. The answering service, at operation 418, outputs the greeting message. After that, the answering service, at operation 420, records a caller message that is uttered by the caller in response to the greeting message until the call is terminated (by the caller or automatically after a predefined maximum time). The warning app, at operation 422, then generates the call recording by concatenating the greeting message (e.g., saved locally during the configuration of the answering service) and the caller message (e.g., retrieved from the answering service).

After the recording at operation 414 or operation 422, the warning app transmits the call recording to the server (e.g., via the Wi-Fi driver), for example, as soon as the smartphone connects to any access point. The process can then return to the operation 402 waiting for a next call (not shown).

Referring back to operation 410, if the caller number is found in the warning list, the warning app retrieves the call information of the caller number from the warning list. This is illustrated at operation 426. The warning app, at operation 428, displays the call information (e.g., via a display driver) in association with the indication of the call that is received. For example, in this way the receiver can be informed of the caller identity, the caller's organization, why the caller is likely calling, and/or how the receiver of the smartphone reacted to corresponding calls in the past. The call is then processed, and the receiver can accept or decline the call (e.g., according to the call information). The process can then return to the operation 402 (not shown), waiting for a next call. Alternatively (not shown), the process can return to operation 412 to repeat some operations described above.

Moving to the swim-lane of the server, a warning manager (e.g., warning manager 305) receives a call recording from the smartphone. This is illustrated at operation 430. The warning manager identifies a user associated with the receiver number of the smartphone in the user table, and then it retrieves the voiceprints of the corresponding receiver therefrom. This is illustrated at operation 432. The warning manager analyzes a receiver speech of the call recording that has been uttered by one of the receivers. This is illustrated at operation 434.

Referring now to FIG. 4B, shown is a flow-diagram illustrating an extension of process 400 for controlling incoming calls, in accordance with embodiments of the present disclosure.

During analysis, a speaker analyzer (e.g., speaker analyzer 320) partitions the call recording into vocal segments that have been uttered by different speakers. The speaker analyzer can then compare the vocal segments in succession against the voiceprints of the receivers. Each vocal segment that matches the voiceprint of one of the receivers is recognized to have been uttered by this receiver and an identifier thereof (e.g., defined by its progressive number in the call recording) is added to a receiver speech list defining the receiver speech, which can be initially empty. The remaining vocal segments (the identifiers which are not comprised in the receiver speech list) define a caller speech that has been uttered by the caller.

A loop is now performed to process the vocal segments of the call recording in succession. The loop begins at operation 436, wherein the warning manager takes a current vocal segment of the call recording into account (e.g., starting from the initial vocal segment). A determination is then made regarding whether the user corresponding to the vocal segment is the receiver or caller. This is illustrated at operation 438. If the current vocal segment has been uttered by the receiver (as indicated by its identifier in the receiver speech list), a speech recognizer (e.g., speech recognizer 325) converts the current vocal segment into corresponding text. This is illustrated at operation 440.

With reference now to operation 442, at a first iteration of the loop, the warning manager retrieves key questions from the corresponding repository. The key questions can be user customized or default key questions. In any case, the text analyzer searches for and identifies any receiver question in the current text. In embodiments, a match is determined if the text has any sentences which have substantially the same meaning as one of the key questions. A determination is then made whether a key question is found in the text. This is illustrated at operation 444.

If a receiver question has been found, the warning manager iterates to a next vocal message following the current vocal message in the call recording, if any. This is illustrated at operation 446. The speech recognizer converts the next vocal message into the next corresponding text sequence. This is illustrated at operation 448. The text analyzer extracts a caller answer to the receiver question from the next text message. The warning manager then adds the receiver question and the caller answer to a call information variable of the call information of the call. This is illustrated at operation 450.

Returning to operation 444, if no receiver question (corresponding to any key questions) has been found, the process 400 proceeds to operation 452. At a first iteration of the loop, the warning manager retrieves any mood statements from the corresponding repository. In embodiments, the text analyzer searches for and identifies any receiver statement in the current text as defined by a sentence having substantially the same meaning as one of the mood statements.

A determination is then made whether the mood statement is found. This is illustrated at operation 454. If a receiver statement has been found, the warning manager adds the receiver statement to the call information variable. This is illustrated at operation 456. After adding the receiver question at operation 450, adding the receiver statement at operation 456, or not identifying a statement at operation 454, a determination is made whether the last vocal segment of the call recording has been processed. This is illustrated at operation 458. If not, the process 400 returns to operation 436 to iterate the loop on a next vocal segment. Conversely (once all the vocal segments of the call recording have been processed), the loop is terminated by proceeding to operation 460.

At operation 460, a determination is made regarding whether a warning status is indicated for the telephone call. If the call information variable is empty, the warning status is not detected and then the process returns to operation 430 (waiting for a next call recording) of FIG. 4A. Conversely, if the call information variable is not empty, the warning status is detected. In response thereto, a speaker analyzer determines the voiceprint of the caller from the caller speech. This is illustrated at operation 462.

Referring now to FIG. 4C, shown is a flow-diagram illustrating an extension of process 400 for controlling incoming calls, in accordance with embodiments of the present disclosure.

The speaker analyzer searches for and identifies the voiceprint of the caller in the global caller table. This is illustrated at operation 464. A determination is then made whether the voiceprint of the caller is found in the global caller table. This is illustrated at operation 466. If the voiceprint of the caller does not match the voiceprint of any warning callers present in the global caller table, the warning manager can generate a new identifier for the caller and then adds a new entry to the global caller table with the identifier of the caller and his/her voiceprint. This is illustrated at operation 468. Conversely, if a warning caller is found in the global caller table having the voiceprint matching the one of the caller (thus having the same identifier), the warning manager retrieves the call information of the known warning caller from all the personal caller tables. This is illustrated at operation 470.

A determination is then made whether the call information of the caller is congruent with the call information of the known warning caller. This is illustrated at operation 472. For example, for each receiver question in the call information of the caller, the warning manager searches for any receiver question having substantially the same meaning in the call information of the known warning caller. The warning manager compares the corresponding caller answers to verify whether they are substantially the same (e.g., using natural language processing techniques or by referencing one or more relational databases).

If the call information of the caller is not congruent with the call information of the known warning caller, the warning manager updates the call information of the caller (e.g., in the call information variable) and/or the call information of the known warning caller (e.g., in the corresponding personal caller tables) accordingly. This is illustrated at operation 474. For example, if in response to the receiver question "Who is calling" the caller answer is always "Name1" for the known warning caller and "Name2" for the caller, a corresponding notice is added to the call information of the caller indicating that the name of the caller is probably false. Conversely, if in response to the receiver question "What is your company" the caller answer is always "Company1" for the known warning caller and "Company2" for the caller, a corresponding notice is added to the call information of the known warning caller indicating that the company of the caller has probably changed. This significantly improves the reliability of the call information.

Process 400 then proceeds to operation 476 from operation 468, from operation 474, or from operation 472. At operation 476, the warning manager updates the entry of the user in the user table by adding the caller number to its warning telephone numbers and then by adding the identifier of the caller to its warning callers. The warning manager then updates the personal caller table of the user by adding a corresponding entry with the identifier of the caller and then by changing the corresponding call information according to the call information variable. This is illustrated at operation 478. For example, the warning manager can add any receiver question with the corresponding caller answer. When the receiver question is not present, the warning manager can replace the caller answer of any receiver question that is already present and replace any receiver statement.

The warning manager then synchronizes the associations among the warning numbers and the warning callers in the user database. This is illustrated at operation 480. Particularly, the warning manager can search for any warning numbers (different from the caller number) that are associated with the identifier of the caller (in the entry of any other users in the user table). For each alternative warning number, the warning manager adds the caller number with the identifier of the caller to the warning numbers of the other users (in the corresponding entries of the user table). Moreover, the warning manager can add each alternative warning number with the identifier of the caller to the warning numbers of the user (in the corresponding entry of the user table). In this way, each user becomes aware of all the caller numbers that have been used by the same caller.

The warning manager then deploys any updates of the user database to the smartphones of the corresponding users (e.g., periodically, such as every night). This is illustrated at operation 482. Particularly, for each user whose entry in the user table or whose personal caller table has changed, the warning manager generates a new version of the corresponding warning list. In embodiments, the warning manager adds an entry for each warning number (indicated in the user table). The warning manager then retrieves the call information (from the personal caller table) for each warning caller of the warning number (indicated in the user table) and adds it to the call information of the warning number. In this way, the call information is as complete as possible (e.g., corresponding to all the possible warning callers that can use each warning number). The warning manager uploads the warning list to the corresponding smartphone. The process then returns to the operation 430 (of FIG. 4A), waiting for a next call recording.

With reference to the swim-lane of each smartphone to which the new version of the warning list has been uploaded, the warning app of the smart phone receives the update (e.g., via the Wi-Fi drive). This is illustrated at operation 484. In response thereto, the warning app saves the new version of the warning list (by replacing its previous version). This is illustrated at operation 486. The process then returns to the operation 484 waiting for a next new version of the warning list.

Naturally, to satisfy local and specific requirements, a person skilled in the art can apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure can be practiced without the specific details (such as the numerical values) set forth in the preceding description to provide a more thorough understanding thereof. Conversely, well-known features may have been omitted or simplified in order not to obscure the description with unnecessary particulars. Moreover, it is expressly intended that specific elements and/or method steps described in connection with any embodiment of the present disclosure can be incorporated in any other embodiment as a matter of general design choice.

Moreover, items presented in a same group and different embodiments, examples or alternatives are not to be construed as de facto equivalent to each other (but they can be separate and autonomous entities). In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, embodiments provide a method for controlling incoming calls. However, the calls can be of any type (for example, implemented by telephones, radio transceivers, apps, instant messages services and so on).

In embodiments, the method comprises performing operations under the control of a computing system. However, the computing system can be of any type (for example, the service computing machine and/or the terminal device).

In embodiments, the method comprises receiving (by the computing system) a call recording. However, the call recording can be received in any way (for example, by the service computing machine from the terminal device over the telephone network or via an access point, in real time, as soon as possible or periodically such as every night, directly by the terminal device and so on).

In embodiments, the call recording is at least part of a call received by a terminal device from a caller identifier of a caller. However, the call recording can be of any type (for example, a vocal stream or a text message, limited to any part of the call, equal to the whole call and so on). The call can be received by any terminal device (e.g., a telephone, a tablet, a computer and so on) from any caller (e.g., a person or a machine) having any identifier (for e.g., a telephone number, a userID and so on).

In embodiments, the method comprises verifying (by the computing system) a warning status of the call according to a conversation pattern of the call recording. However, the warning status can be verified in any way (e.g., according to questions and answers, mood statements, simply on the basis of their presence, or by comparing a warning index of the caller (e.g., based on the conversation patterns) with a threshold).

In embodiments, the method comprises determining (by the computing system) the call information of the call based on the conversation pattern in response to determining the warning status of the call. However, the call information can be determined in any suitable manner (e.g., comparing questions/answers of previous calls to current calls, comparing mood statements of previous calls to current calls, or according to the call's congruency with respect to previous call information of the same terminal device and/or of other terminal devices).

In embodiments, the method comprises updating (by the computing system) a warning structure comprising the call information of one or more warning caller identifiers. However, the warning structure can be of any type (for example, a database with any number of tables, one or more files and so on) and it can be organized in any way (for example, indicating the call information of each warning caller and then the warning callers of each warning caller identifier, indicating the call information of each warning caller identifier directly and so on).

In embodiments, the warning structure is updated according to the caller identifier and the call information of the call. However, the warning structure can be updated in any way (for example, independently or further synchronized with respect to other terminal devices and so on).

In embodiments, the warning structure is for use by the terminal device to control the incoming calls. However, the incoming calls can be controlled in any way (e.g., by outputting the call information, blocking the warning numbers, using a bot to respond to the calls from the warning numbers and so on) according to the warning structure (e.g., directly or by generating a working version thereof such as a warning list or table, locally or remotely via a corresponding service and so on).

In embodiments, the method comprises comparing (by the computing system) a receiver speech of the call recording that has been uttered by a receiver of the call according to a predefined voiceprint of the receiver (with a remaining part of the call recording that defines a caller speech of the call recording that has been uttered by the caller). However, the receiver speech can be compared in any way according to any voiceprint of the receiver (for example, with any model, method and algorithm).

In embodiments, the method comprises verifying (by the computing system) the warning status of the call according to the receiver speech. However, the warning status can be verified according to the receiver speech alone, the receiver speech and the caller speech or even the caller speech alone.

In embodiments, the method comprises finding (by the computing system) one or more receiver questions in the receiver speech corresponding to one or more predefined key questions. However, the key questions can be in any number and of any type (for example, partial, different or additional key questions with respect to the ones mentioned above) and the receiver questions can be found in any way (for example, equal to the key questions or having the same or similar meanings).

In embodiments, the method comprises determining (by the computing system) the warning status of the call in response to the receiver questions. However, the warning status can be determined in any way (for example, when any number of key questions has been found, from at least one to all of them).

In embodiments, the method comprises identifying (by the computing system) corresponding caller answers to the receiver questions, each one within a segment of the caller speech that immediately follows a segment of the receiver speech containing the corresponding receiver question. However, each caller answer can be determined in any way according to the corresponding segment (for example, by setting the caller answer simply equal to the segment or by searching the caller answer within the segment according to the corresponding receiver question).

In embodiments, the method comprises determining (by the computing system) the call information of the call based on the receiver questions and the corresponding caller answers. However, the call information can be determined in any way (for example, by simply concatenating the receiver question and the caller answer of each pair, by re-phasing each pair into a corresponding sentence, and so on).

In embodiments, the method comprises finding (by the computing system) one or more receiver statements in the receiver speech corresponding to one or more predefined mood statements. However, the mood statements can be in any number and of any type (for example, partial, different or additional mood statements with respect to the ones mentioned above, expressing any positive, negative and/or neutral mood) and the receiver statements can be found in any way (for example, equal to the mood statements or having the same or similar meanings).

In embodiments, the method comprises determining (by the computing system) the warning status of the call in response to the receiver statements. However, the warning status can be determined in any way (for example, when any number of mood statements has been found, from at least one to all of them).

In embodiments, the method comprises determining (by the computing system) the call information of the call based on the receiver statements. However, the call information can be determined in any way (for example, according to the receiver statements as-is or re-phased, according to any quantitative indicator of the (positive/negative) mood based thereon or any combination thereof).

In embodiments, the method comprises verifying (by the computing system) a congruency of the call information of the call with further call information of the caller identifier in corresponding further warning structures for one or more further terminal devices. However, the congruency can be verified with any number of further warning structures in any way (for example, according to any match of the call information of the call with the further call information of any percentage of the further terminal devices, up to all of them and so on).

In embodiments, the method comprises updating (by the computing system) the call information and/or the further call information according to the congruency thereof. However, the update can be applied to the call information only, to the call information and the further call information or even to the further call information only in any way (for example, by adding notices, correcting or deleting information and so on).

In embodiments, the warning structure comprises the voiceprint and the call information of one or more warning callers and the warning structure associates each of the warning caller identifiers with one or more of the warning callers. However, this result can be achieved in any way (for example, with joined tables, pointers and so on).

In embodiments, in response to the warning status of the call, the method comprises determining (by the computing system) the voiceprint of the caller according to the caller speech. However, the voiceprint can be determined in any way (for example, with models, neural networks and so on).

In embodiments, in response to the warning status of the call the method comprises updating (by the computing system) the warning structure according to the caller identifier, the voiceprint of the caller and the call information of the call. However, the warning structure can be updated in any way (for example, by verifying whether the caller is already present, by adding the caller indiscriminately and then removing duplicated callers periodically and so on).

In embodiments, the method comprises synchronizing (by the computing system) the warning callers associated with each of the warning caller identifiers with further warning callers associated with each of the further warning caller identifiers in corresponding further warning structures for one or more further terminal devices. However, the warning structure can be synchronized with any number of further warning structures in any way (for example, by updating the warning structure only, the warning structure and the further warning structures or even the further warning structures only in any way, such as by adding corresponding entries or notices, in real-time or periodically and so on).

In embodiments, the computing system is a service computing machine. However, the service computing machine can be of any type (see below).

In embodiments, the method comprises receiving (by the service computing machine) the call recording from the terminal device over a telecommunication network. However, the call recording can be received in any way (for example, in real-time, as soon as a corresponding connection is available or periodically) over any telecommunication network (see below).

In embodiments, the method comprises transmitting (by the service computing machine) at least an update of the warning structure to the terminal device. However, any part of the warning structure (for example, entirely or in incremental mode) can be transmitted in any way (for example, as soon as it is updated or periodically, in push or pull mode and so on).

In embodiments, the method comprises receiving (by the terminal device) a further call from a further caller identifier comprised in the warning caller identifiers. However, the further call can be received in any way (either the same or different with respect to above).

In embodiments, the method comprises retrieving (by the terminal device) the call information of the further caller identifier from the warning structure. However, the call information can be retrieved in any way (for example, directly from the further caller identifier or through the corresponding warning callers and so on).

In embodiments, the method comprises outputting (by the terminal device) an indication of the receiving of the further call in association with the call information of the further caller identifier. However, the call information can be output in any way (for example, in text and/or audio form) in association with the receiving of the further call (for example, together with a corresponding notification or in advance).

In embodiments, the method comprises recording (by the terminal device) the call recording in response to the caller identifier being not present in a list of personal contacts. However, the call recording can be recorded in any way (for example, interactively or via an answering service, even indiscriminately for all the telephone calls).

In embodiments, the method comprises redirecting (by the terminal device) the call to an answering service in response to the caller identifier being not present in the list of personal contacts to prompt the caller to record a caller message. However, the answering service can be of any type (for example, a local answering machine, a local program, a remote service and so on) and it can prompt the caller to record the caller message in any way (for example, with the greeting message asking one or more key questions or simply to leave a message).

In embodiments, the method comprises generating (by the terminal device) the call recording according to the caller message. However, the call recording can be generated in any way (for example, equal to the caller message only, to the greeting message followed by the caller message and so on).

In embodiments, the method comprises generating (by the terminal device) the call recording by recording a first part of the call with at most a predefined duration. However, the call recording can be recorded in any way (for example, with a fixed duration, in response to start and/or stop commands of the receiver or for the whole call).

In embodiments, the terminal device is a telephone device. However, the telephone device can be of any type (for example, a smartphone, a cordless telephone, a VoiP telephone and so on).

Generally, similar considerations apply if the same solution is implemented with equivalent methods (by using similar steps with the same functions of more steps or portions thereof, removing some non-essential steps or adding further optional steps); moreover, the steps can be performed in a different order, concurrently or in an interleaved way (at least in part).

Embodiments provides a computer program configured for causing a computing system to perform each of the above-described methods when the computer program is executed on the computing system. Embodiments provide a computer program product that comprises a computer readable storage medium having program instructions embodied therewith; the program instructions are executable by a computing system to cause the computing system to perform the same method. However, the computer program can be implemented as a stand-alone module, as a plug-in for a pre-existing software program (for example, a service application of a telephone operator) or even directly in the latter. Moreover, the computer program can be executed on any computing system (see above). In any case, the solution according to embodiments of the present disclosure lends itself to be implemented even with a hardware structure (for example, by electronic circuits integrated in one or more chips of semiconductor material), or with a combination of software and hardware suitably programmed or otherwise configured.

Embodiments provide a system comprising means that are configured for performing the steps of the above-described method. Embodiments provide a system comprising a circuit (i.e., any hardware suitably configured, for example, by software) for performing each of the steps of the same method. However, the system can be of any type (for example, the service computing machine alone, the terminal device alone or the service computing machine with one or more terminal devices communicating among them over any local area, wide area, global, mobile or satellite telecommunication network using any kind of wired or wireless connections).

Generally, similar considerations apply if the computing system has a different structure or comprises equivalent components or it has other operative characteristics. In any case, every component thereof can be separated into more elements, or two or more components can be combined together into a single element; moreover, each component can be replicated to support the execution of the corresponding operations in parallel. Moreover, unless specified otherwise, any interaction between different components generally does not need to be continuous, and it can be either direct or indirect through one or more intermediaries.

Figure 5:
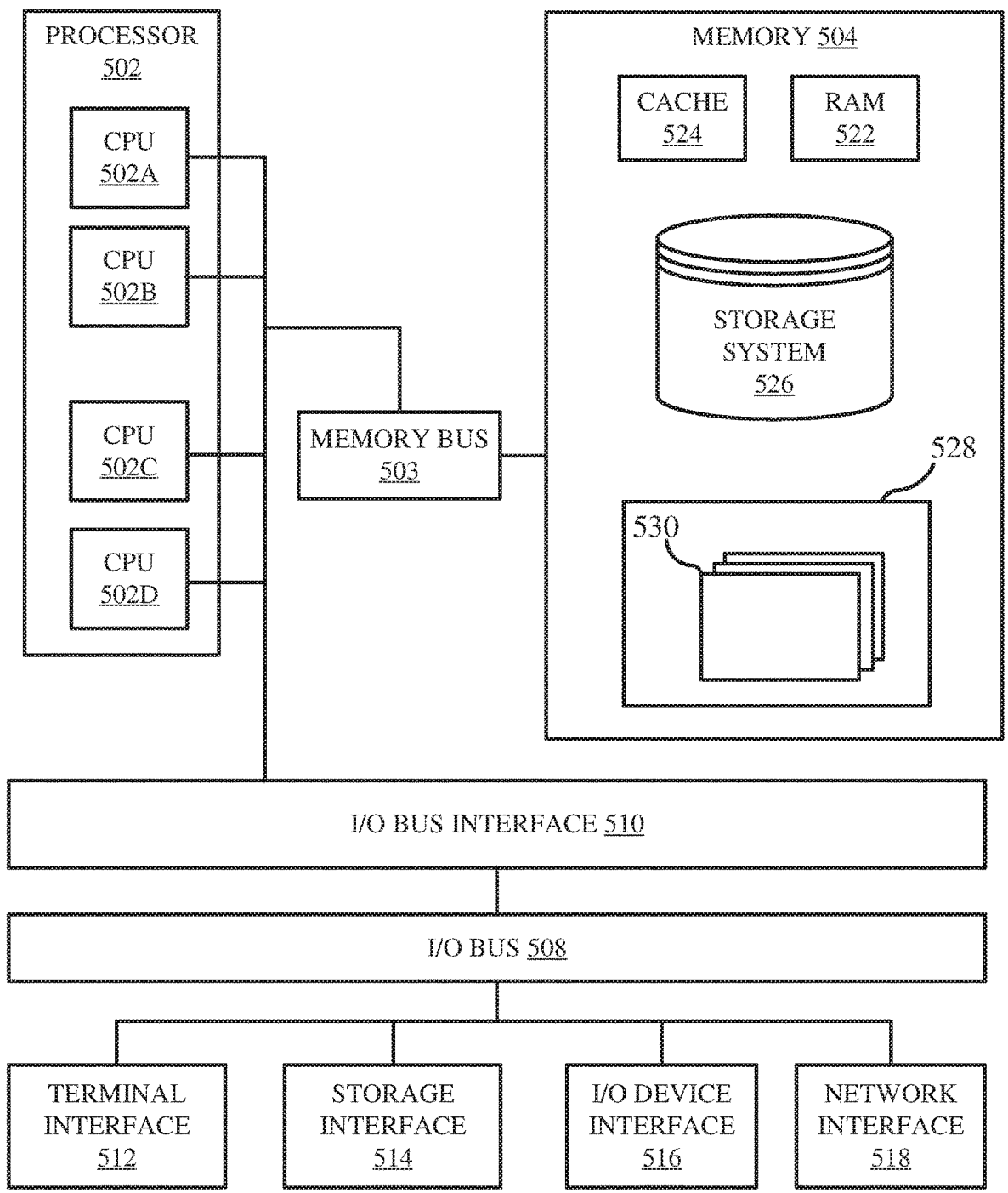
FIG. 5 is a high-level block diagram illustrating an example computer system that can be used in implementing one or more of the methods, tools, and modules, and any related functions, described herein, in accordance with embodiments of the present disclosure.

Referring now to FIG. 5, shown is a high-level block diagram of an example computer system 501 (e.g., smart phone 105 or server 110) that can be used in implementing one or more of the methods, tools, and modules, and any related functions, described herein (e.g., using one or more processor circuits or computer processors of the computer), in accordance with embodiments of the present disclosure. In some embodiments, the major components of the computer system 501 can comprise one or more CPUs 502, a memory subsystem 504, a terminal interface 512, a storage interface 514, an I/O (Input/Output) device interface 516, and a network interface 518, all of which can be communicatively coupled, directly or indirectly, for inter-component communication via a memory bus 503, an I/O bus 508, and an I/O bus interface unit 510.

The computer system 501 can contain one or more general-purpose programmable central processing units (CPUs) 502A, 502B, 502C, and 502D, herein generically referred to as the CPU 502. In some embodiments, the computer system 501 can contain multiple processors typical of a relatively large system; however, in other embodiments the computer system 501 can alternatively be a single CPU system. Each CPU 502 can execute instructions stored in the memory subsystem 504 and can include one or more levels of on-board cache.

System memory 504 can include computer system readable media in the form of volatile memory, such as random access memory (RAM) 522 or cache memory 524. Computer system 501 can further include other removable/non-removable, volatile/non-volatile computer system storage media. By way of example only, storage system 526 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. In embodiments, memory 504 can include a magnetic tape system. Memory devices can be connected to memory bus 503 by one or more data media interfaces. The memory 504 can include at least one program product having a set (e.g., at least one) of program modules that are configured to carry out the functions of various embodiments.

One or more programs/utilities 528, each having at least one set of program modules 530 can be stored in memory 504. The programs/utilities 528 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 can, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices can be connected directly to one or more system I/O buses.

In some embodiments, the computer system 501 can be a multi-user mainframe computer system, a single-user system, or a server computer or similar device that has little or no direct user interface, but receives requests from other computer systems (clients). Further, in some embodiments, the computer system 501 can be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system

501. In some embodiments, however, individual components can have greater or lesser complexity than as represented in FIG. 5, components other than or in addition to those shown in FIG. 5 can be present, and the number, type, and configuration of such components can vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   receiving, by a computing system, a call recording corresponding to at least a portion of a call between a receiver and a caller;
   distinguishing, by the computing system, a receiver speech portion of the call recording using a predefined voiceprint of the receiver, a remaining portion of the call recording defining a caller speech portion of the call;
   searching, by the computing system, one or more receiver questions in the receiver speech portion corresponding to one or more predefined key questions;
   identifying, by the computing system, corresponding caller answers to the receiver questions;
   verifying, by the computing system, a warning status of the call according to the receiver questions and a conversation pattern of the call recording;
   determining, by the computing system, call information of the call based on the receiver questions and the corresponding caller answers; and
   updating, by the computing system, in response to verifying the warning status, a warning structure with call information based on the conversation pattern, the warning structure used for controlling future incoming calls.

2. The method of claim 1, further comprising:
   searching, by the computing system, one or more receiver statements in the receiver speech corresponding to one or more predefined mood statements, wherein the warning status of the call is determined according to the receiver statements; and
   determining, by the computing system, the call information of the call based on the receiver statements.

3. The method of claim 1, wherein in response to verifying the warning status of the call, the method further comprises:
   determining, by the computing system, a voiceprint of the caller according to the caller speech; and
   updating, by the computing system, the warning structure with the voiceprint of the caller.

4. The method of claim 1, wherein the call information includes a number of the caller, an identifier of the caller, a purpose of the call, and a mood of the receiver during the call.

5. The method of claim 4, wherein the method further comprises:
   transmitting the number of the caller, the identifier of the caller, the purpose of the call, and the mood of the receiver to a terminal device of the receiver in response to the receiver receiving a second call from the number of the caller.

6. A system comprising:
   a memory storing program instructions; and
   a processor, wherein the processor is configured to execute the program instructions to perform a method comprising:
      receiving a call recording corresponding to at least a portion of a call between a receiver and a caller;
      distinguishing, by the computing system, a receiver speech portion of the call recording using a predefined voiceprint of the receiver, a remaining portion of the call recording defining a caller speech portion of the call;

searching, by the computing system, one or more receiver questions in the receiver speech portion corresponding to one or more predefined key questions;

identifying, by the computing system, corresponding caller answers to the receiver questions;

verifying a warning status of the call according to the receiver questions and a conversation pattern of the call recording;

determining, by the computing system, call information of the call based on the receiver questions and the corresponding caller answers; and updating, in response to verifying the warning status, a warning structure with call information based on the conversation pattern, the warning structure used for controlling future incoming calls.

7. The system of claim 6, wherein the method performed by the processor further comprises:

searching one or more receiver statements in the receiver speech corresponding to one or more predefined mood statements, wherein the warning status of the call is determined according to the receiver statements; and determining the call information of the call based on the receiver statements.

8. The system of claim 6, wherein in response to verifying the warning status of the call, the method performed by the processor further comprises:

determining a voiceprint of the caller according to the caller speech; and updating the warning structure with the voiceprint of the caller.

9. The system of claim 6, wherein the call information includes a number of the caller, an identifier of the caller, a purpose of the call, and a mood of the receiver during the call.

10. The system of claim 9, wherein the method performed by the processor further comprises:

transmitting the number of the caller, the identifier of the caller, the purpose of the call, and the mood of the receiver to a terminal device of the receiver in response to the receiver receiving a second call from the number of the caller.

11. A computer program product comprising a computer readable storage medium having program instructions embodied therewith, the program instructions executable by a processor to cause the processor to perform a method comprising:

receiving, by a computing system, a call recording corresponding to at least a portion of a call between a receiver and a caller;

distinguishing, by the computing system, a receiver speech portion of the call recording using a predefined voiceprint of the receiver, a remaining portion of the call recording defining a caller speech portion of the call;

searching, by the computing system, one or more receiver questions in the receiver speech portion corresponding to one or more predefined key questions;

identifying, by the computing system, corresponding caller answers to the receiver questions;

verifying, by the computing system, a warning status of the call according to the receiver questions and a conversation pattern of the call recording;

determining, by the computing system, call information of the call based on the receiver questions and the corresponding caller answers; and updating, by the computing system, in response to verifying the warning status, a warning structure with call information based on the conversation pattern, the warning structure used for controlling future incoming calls.

12. The computer program product of claim 11, wherein the method performed by the processor further comprises:

searching one or more receiver statements in the receiver speech corresponding to one or more predefined mood statements, wherein the warning status of the call is determined according to the receiver statements; and determining the call information of the call based on the receiver statements.

13. The computer program product of claim 11, wherein in response to verifying the warning status of the call, the method performed by the processor further comprises:

determining a voiceprint of the caller according to the caller speech; and updating the warning structure with the voiceprint of the caller.

14. The computer program product of claim 11, wherein the call information includes a number of the caller, an identifier of the caller, a purpose of the call, and a mood of the receiver during the call.

* * * * *